(12) United States Patent
Shiraishi et al.

(10) Patent No.: US 7,079,188 B2
(45) Date of Patent: Jul. 18, 2006

(54) OBJECT DETECTING APPARATUS

(75) Inventors: Akira Shiraishi, Sakai (JP); Kenji Nakamura, Sakai (JP)

(73) Assignee: Minolta Co., Ltd., Osaka (JP)

( * ) Notice: Subject to any disclaimer, the term of this patent is extended or adjusted under 35 U.S.C. 154(b) by 610 days.

(21) Appl. No.: 10/179,572

(22) Filed: Jun. 25, 2002

(65) Prior Publication Data

US 2003/0164892 A1    Sep. 4, 2003

(30) Foreign Application Priority Data

Jun. 27, 2001    (JP) ............................. 2001-195126

(51) Int. Cl.
  *G03B 13/00*    (2006.01)
  *H04N 5/222*    (2006.01)

(52) U.S. Cl. ...................... 348/350; 348/348; 348/352; 348/333.03

(58) Field of Classification Search ............................... 348/333.01–333.03, 345–346, 348–352
See application file for complete search history.

(56) References Cited

U.S. PATENT DOCUMENTS

| 5,315,339 | A  |   | 5/1994 | Hamada et al. | ............. 354/400 |
| 5,758,201 | A  | * | 5/1998 | Watanabe et al. | ............. 396/51 |
| 6,118,484 | A  | * | 9/2000 | Yokota et al. | ............. 348/350 |
| 6,219,492 | B1 |   | 4/2001 | Maehama et al. | ............ 396/50 |
| 6,522,360 | B1 | * | 2/2003 | Miyawaki et al. | ........... 348/347 |
| 6,785,469 | B1 | * | 8/2004 | Ide et al. | ..................... 396/121 |

* cited by examiner

*Primary Examiner*—Ngoc-Yen Vu
*Assistant Examiner*—Carramah J. Quiett
(74) *Attorney, Agent, or Firm*—Sidley Austin LLP (57) ABSTRACT

An object detecting apparatus according to the present invention has: an image sensor capturing a plurality of object images in time sequence; a first detection start signal generator generating a signal to start detection of an object, included in a first area, of the object images captured by the image sensor; a first detector detecting a characteristic of the object included in the first area in response to the signal from the first detection start signal generator; and a second detector detecting an object similar to the characteristic detected by the first detector, within a second area larger than the first area. Consequently, even when a moving object is shot, the user can take a picture intended by him only by determining the composition so that the main object is roughly followed.

4 Claims, 8 Drawing Sheets

OBJECT DETECTING APPARATUS

This application is based on the application No. 2001-195126 filed in Japan, the content of which is thereby incorporated by reference.

BACKGROUND OF THE INVENTION

1. Field of the Invention

The present invention relates to an object detecting apparatus for determining a main object to be shot with emphasis, from within the shooting field.

2. Description of the Related Art

Figure 13:
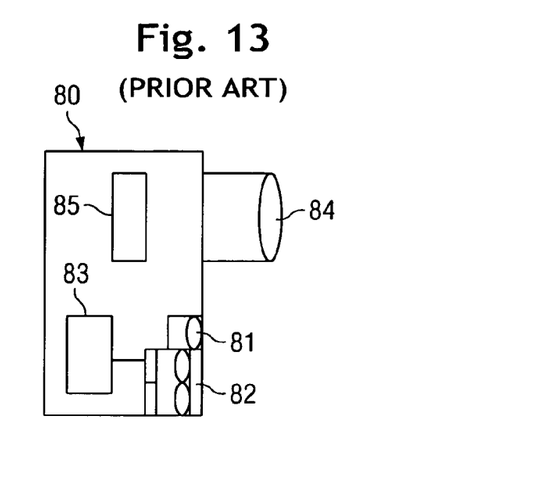
FIG. 13 is a block diagram showing the structure of the conventional camera.

Conventionally, a camera has been widely known that has a microcomputer and automatically adjusts focus and exposure in order that shooting can be performed with an object constituting part of the shooting field as the reference. This camera generally has a structure as shown in FIG. 13. The camera 80 which has a photometer 81 detecting the brightness of the object and a pair of image detectors 82 calculates the distance to the object and the brightness of the object by a microcomputer 83 based on the signals from the photometer 81 and the image detectors 82, and adjusts a taking lens 84 based on the result of the calculation so that an image of the object is formed on imaging means 85.

A distance measurement frame indicating the distance measurement range is provided in the finder of this camera, and the user performs shooting while framing the picture so that the main object is captured in the frame. In order that the distance to the object captured in the distance measurement frame can be measured by the image detectors 82, distance measurement points normally disposed so as to be invisible are provided, and shooting can be performed with focus and exposure adjusted with respect to the object overlapping a distance measurement point.

Figure 14:
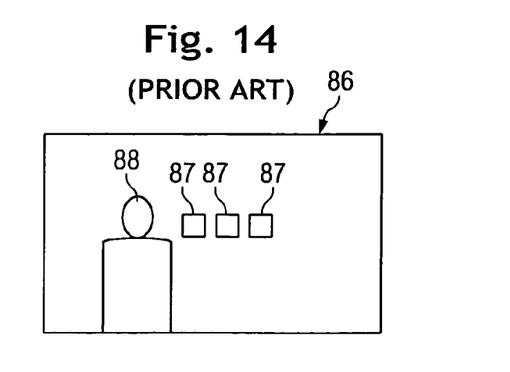
FIG. 14 is a view showing the composition in which the object does not overlap any of the distance measurement points.

However, when the distance measurement range of the camera is small, it sometimes occurs that an object behind the object to be shot is in focus. That is, when a picture is taken with the main object 88 not overlapping any of the distance measurement points 87 as shown in FIG. 14, the main object 88 is not in focus, so that a picture intended by the user cannot be taken.

Figure 15:
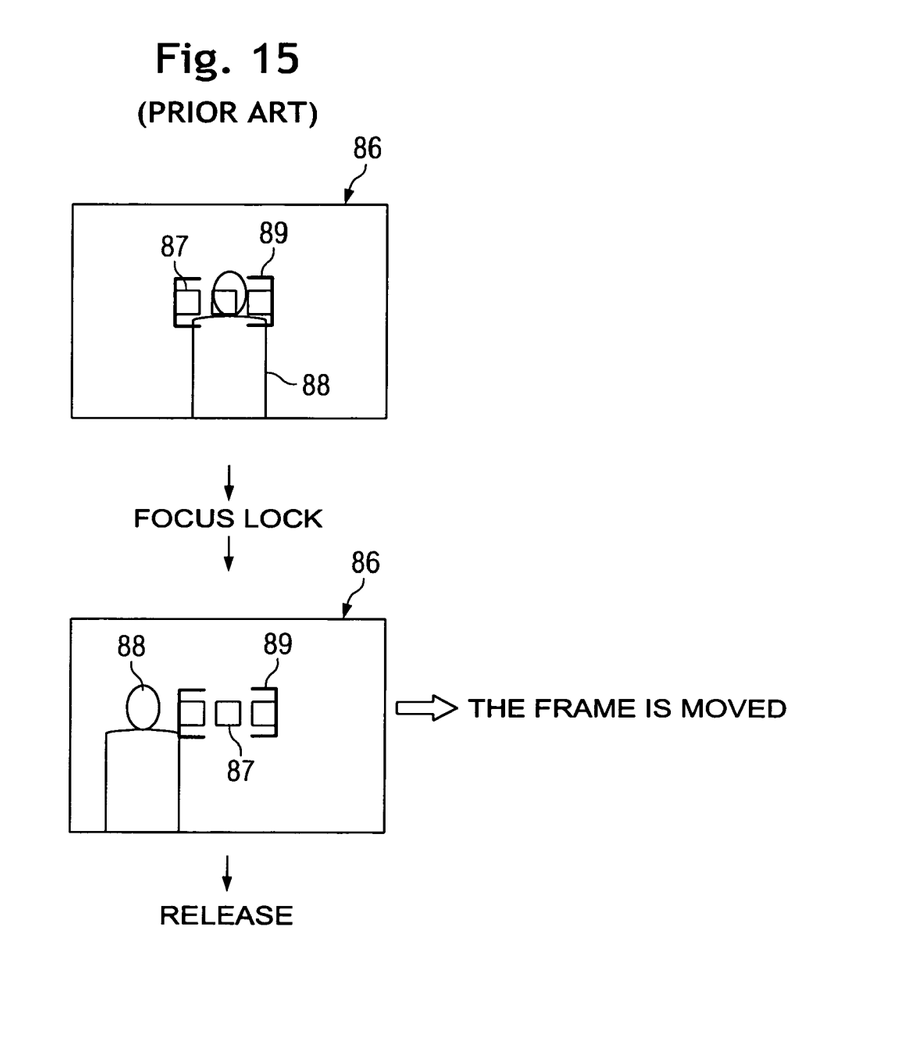
FIG. 15 is an explanatory view of an operation example of the focus lock.

To solve this problem, it has been proposed to perform focus lock by half depressing the release button as shown in FIG. 15. When the release button is half depressed with the main object 88 overlapping the distance measurement frame 89, since the main object 88 is present on a distance measurement point in the distance measurement frame 89, a condition where the main object 88 is in focus is fixed. Then, to obtain the composition intended by the user, the frame is moved with the half-depressed condition of the release button maintained, and then, the release button is fully depressed.

However, according to the focus lock, when a moving object such as a running child or a person participating in a sport is shot, it is difficult to determine when to half depress the release button. Moreover, the obtained picture is out of focus when the distance to the object which is once captured and on which focus is locked changes before the determination of the composition and shooting are actually performed.

On the other hand, an improvement has been made that distance measurement points are disposed in a wide range to increase the distance measurement range. This enables shooting to be performed with the main object as the reference even when the composition is such that the main object is not situated in the center. However, since it is difficult to select a main object in a wide distance measurement range, there are cases where an object not desired by the user is in focus.

Accordingly, to solve these problems, the present invention provides an object detecting apparatus capable of performing shooting with a main object desired by the user as the reference even when the object moves.

SUMMARY OF THE INVENTION

To attain the above-mentioned object, an object detecting apparatus according to the present invention has: an image sensor for capturing a plurality of object images in time sequence; a first detection start signal generator for generating a signal to start detection of an object, included in a first area, of the object images captured by the image sensor; a first detector for detecting a characteristic of the object included in the first area in response to the signal from the first detection start signal generator; a second detector for detecting an object similar to the characteristic detected by the first detector, within a second area larger than the first area; a second detection start signal generator for generating a signal to start detection by the second detector; a detection end signal generator for generating a signal to end the detection by the second detector; and a controller for performing focusing for the object detected by the second detector in response to the signal from the detection end signal generator.

According to this structure, since the main object is first selected from the smaller first area, the control to select the optimum object can be easily performed, so that misdetection can be reduced. Moreover, after the main object is once selected, for the succeeding object image, a similar object is selected from the larger second area, and the following of the main object is performed. Consequently, even when a moving object is shot, the user can take a picture intended by him only by determining the composition so that the main object is roughly followed.

In the following description, like parts are designated by like reference members throughout the several drawings.

DETAILED DESCRIPTION OF THE
PREFERRED EMBODIMENT

A camera according to an embodiment of the present invention will be described with reference to the drawings.

Figure 1:
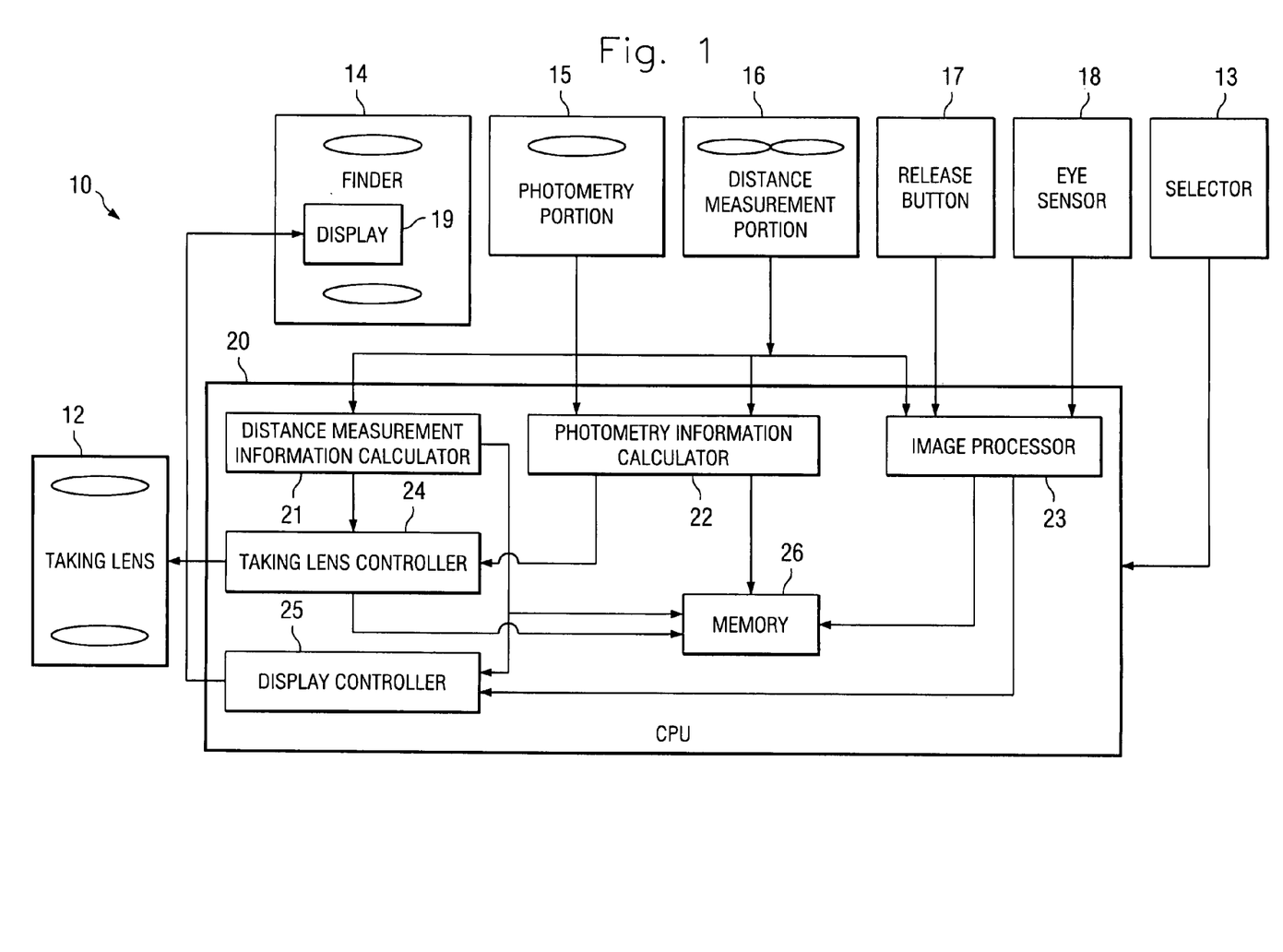
FIG. 1 is a block diagram of a camera according to an embodiment of the present invention.
Figure 2:
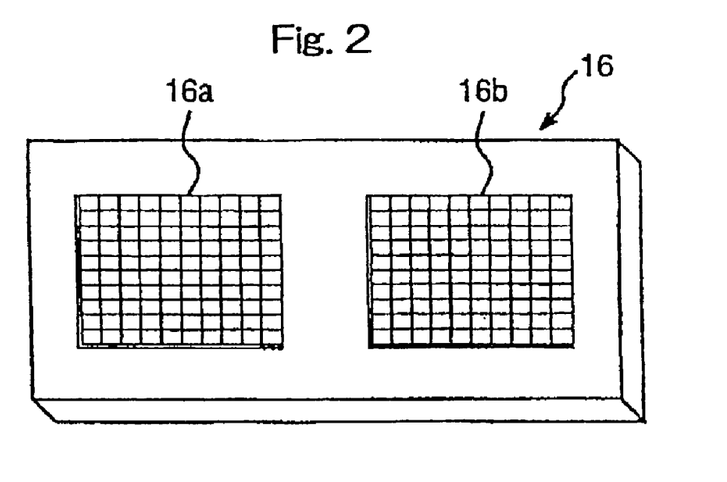
FIG. 2 is a view showing the structure of a distance measurement portion of the camera of FIG. 1.

Referring to FIG. 1, the camera 10 has: a taking lens 12; a finder 14 including a display 19; a photometry portion 15 measuring the brightness of the object; a distance measurement portion 16 measuring the distance to the object for each of a plurality of divisional areas by use of an image sensing apparatus outputting image information in time sequence at regular intervals; a release button 17; an eye sensor 18; and a selector 13. The release button 17 and the eye sensor 18 are used also as signal transmitting means for detecting and following the main object in the present embodiment. While the distance measurement portion 16 has a pair of two-dimensional sensors (area sensors) 16a and 16b as shown in FIG. 2, it may have a pair of line sensors. Moreover, one element may be used both as the photometry portion 15 and the distance measurement portion 16. The selector 13 is used for selecting a shooting mode as described later.

Figure 3:
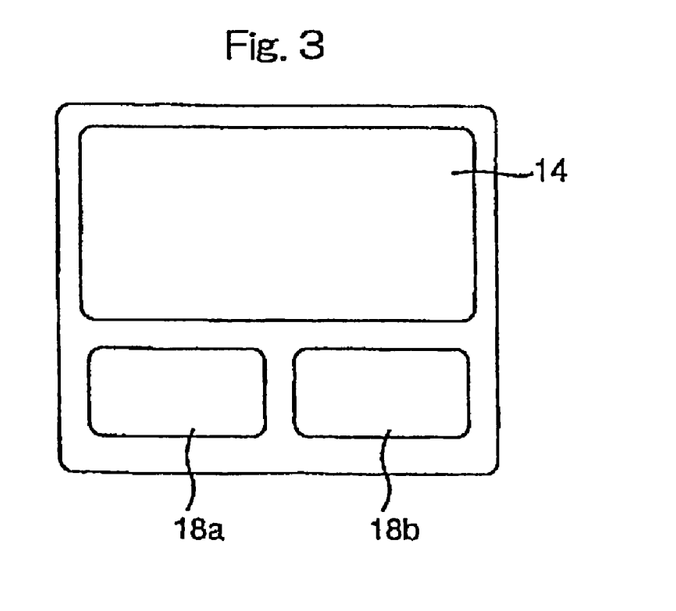
FIG. 3 is a view showing the structure of an eye sensor of the camera of FIG. 1.

FIG. 3 is a view showing the concrete structure of the eye sensor 18. The eye sensor 18 detects whether or not the user is assuming a posture of shooting and is looking through the finder 14. The eye sensor 18 comprises an LED light emitting portion 18a and a light receiving sensor 18b disposed side by side below the finder 14. When the user brings his head close to the finder to look through the finder, light emitted from the LED light emitting portion 18a at predetermined intervals is reflected at the user's face to be incident on the light receiving sensor 18b, so that it is detected that the user is preparing for shooting. In the present embodiment, the signal from the eye sensor 18 is used as a signal to start the detection of the main object.

A CPU 20 has a distance measurement information calculator 21, a photometry information calculator 22, an image processor 23, a taking lens controller 24, a display controller 25, and a memory 26. The distance measurement information calculator 21 processes the output from the distance measurement portion 16, and outputs distance measurement information with respect to each of the divisional distance measurement areas to the taking lens controller 24 and the display controller 25. The photometry information calculator 22 processes the outputs from the photometry portion 15 and the distance measurement portion 16, and transmits photometry information to the taking lens controller 24 and the memory 26. The image processor 23 processes the output from the distance measurement portion 16 at the timing when the signals from the release button 17 and the eye sensor 18 are received. Further, the image processor 23 detects a main following area from a predetermined area based on the result of the processing as described later, and transits the information to the display controller 25 and the memory 26. The taking lens controller 24 controls the taking lens 12 based on the information from the distance measurement information calculator 21 and the photometry information calculator 22. The display controller 25 controls the display 19 of the finder 14 based on the information from the distance measurement information calculator 21 and the image processor 23 to display an in-focus indicator mark within the field frame. The memory 26 stores the information from the photometry information calculator 22, the image calculator 23 and the taking lens controller 24.

Figure 4:
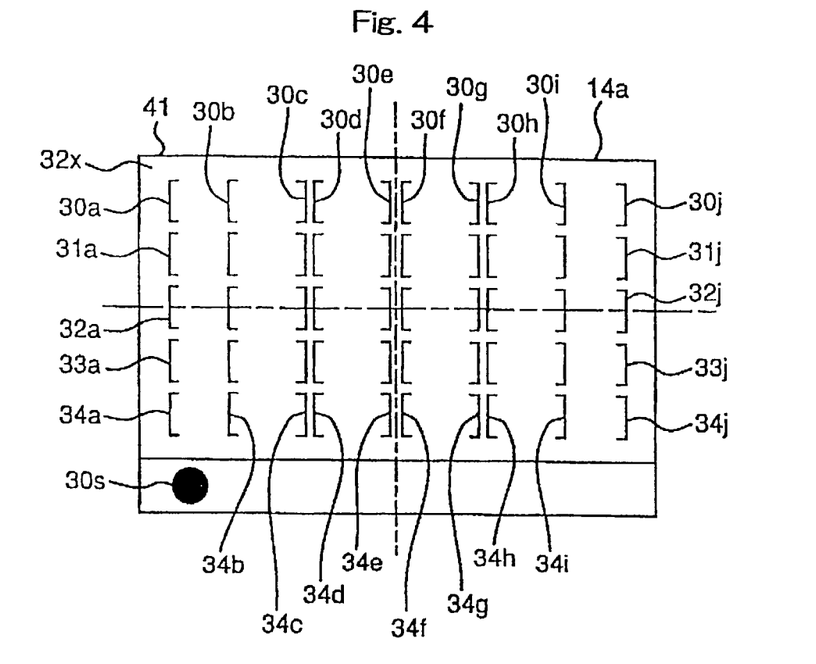
FIG. 4 is an explanatory view of a display provided in a finder of the camera of FIG. 1.
Figure 5:
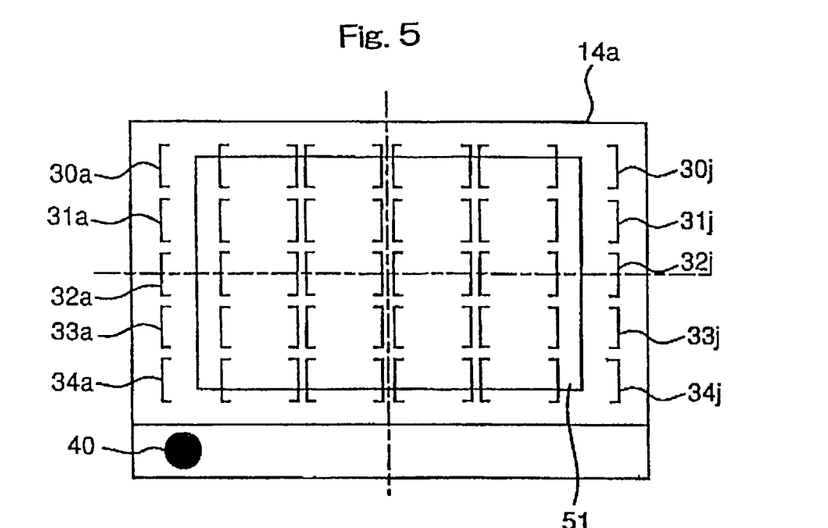
FIG. 5 is an explanatory view of a positional relationship between a distance measurement frame and a first area of the camera of FIG. 1.

On the display 19 of the finder 14, the field frame is displayed as shown in FIG. 4. That is, in the finder, the in-focus indicator mark 40 is displayed outside the field frame, and distance measurement frames 30 to 34 which are arranged in five lines are selectively displayed as appropriate within the field frame 41. Appropriate combinations of distance measurement frames 30 to 34 enable distance measurement frames of various sizes to be displayed in given positions within a finder field 14a. The distance measurement frames 30 to 34 are arranged so as to overlap a first area 51 as an object detection area as shown in FIG. 5. The first area 51 is not necessarily displayed within the field. The distance measurement frames 30 to 34 are displayed by a liquid crystal display (LCD) panel, and the in-focus indicator mark 40 is displayed by a light emitting diode (LED). While a distance measurement frame of a predetermined shape is selected as appropriate and displayed in a predetermined position on the display 19 in the present embodiment, as a modification, for example, a mark of a given shape may be displayed in a given position by use of a dot-matrix liquid crystal display panel.

Figure 6:
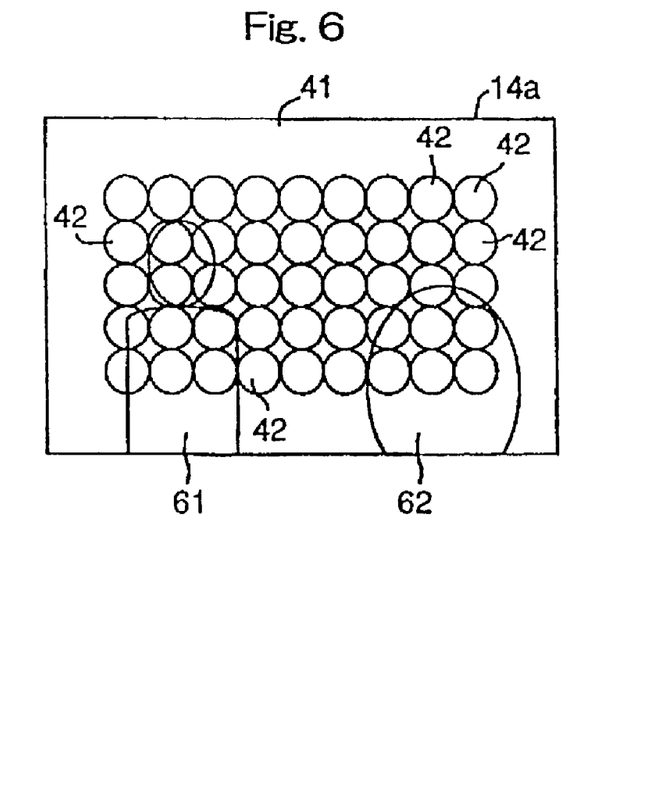
FIG. 6 is a view showing the arrangement of distance measurement points in the shooting field.
Figure 7:
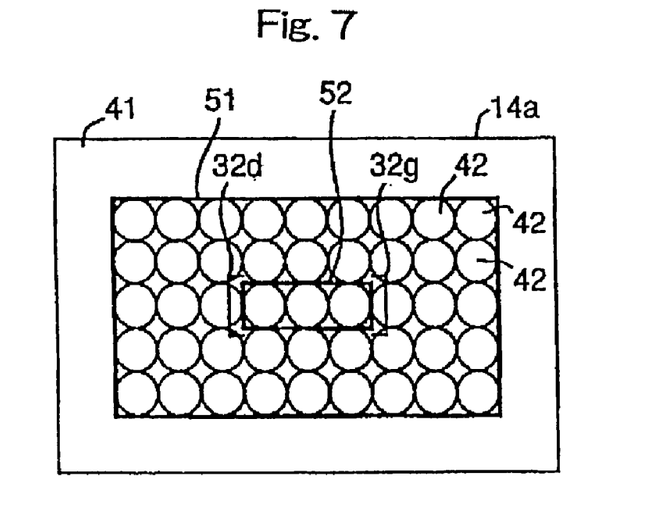
FIG. 7 is an explanatory view of a positional relationship between the first area and the distance measurement points of the camera of FIG. 1.

In the first area 51 as the object detection area, a plurality of distance measurement points 42 is provided as shown in FIGS. 6 and 7, and the distances to objects 61 and 62 displayed so as to overlap the first area 51 can be measured for each of the distance measurement points. A second area 52 is provided in a central part of the first area 51. While the second area 52 may be variable in size, it is desirable that it be an area comprising a combination of a plurality of distance measurement points 42 and distance measurement can be performed for all the positions in the area. It is desirable for the second area 52 to be displayed within the field frame so that the range thereof is clearly shown to the user. In the present embodiment, the second area 52 is shown with distance frames 32d and 32g in normal times.

Figure 8:
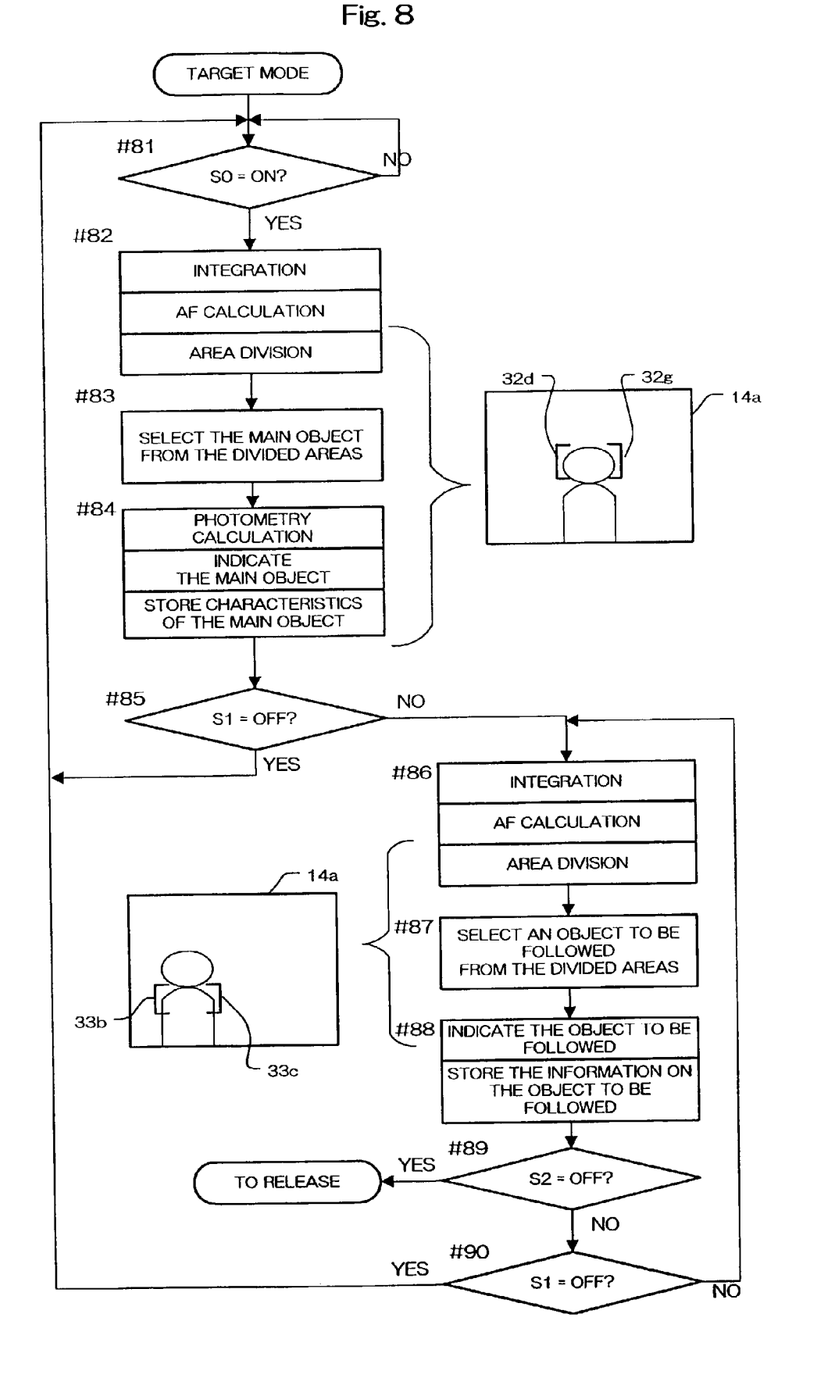
FIG. 8 is a flowchart of the shooting processing in a target mode.

Next, the flow of the shooting processing of the camera according to the present embodiment will be described. The camera according to the present embodiment has three shooting modes, and is capable of switching among these modes as required. One of the modes that is for selecting and following a main object and will be described below will be called a target mode. FIG. 8 is a flowchart of the shooting processing in the target mode. In the target mode, the CPU 20 determines the condition of a switch S0 (not shown) for determining whether the user is looking through the finder 14 or not by the eye sensor 18 at predetermined intervals (step 81). When the user is not looking through the finder 14, that is, when the switch S0 is not on, the condition of the switch S0 is continuously determined at predetermined intervals. When the user is looking through the finder 14, that is, when the switch S0 is on, the process shifts to capture of the data of the shot image.

Figure 9:
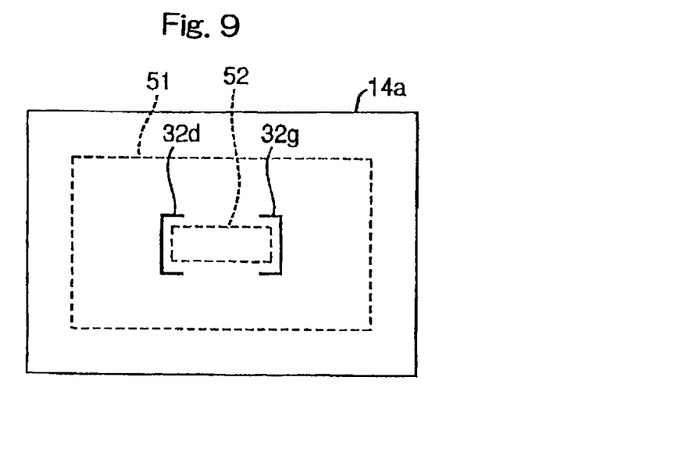
FIG. 9 is an explanatory view of a display provided in the finder when shooting is started.

When the switch S0 becomes on, the data of the shot image is captured by the area sensors provided in the distance measurement portion 16. Now, for convenience of explanation, a case will be described where a subject including the objects 61 and 62 as shown in FIG. 6 is displayed in the field frame. When the user looks through the finder, a display as shown in FIG. 9 is provided in the field frame 14a of the finder. That is, the distance measurement frames 32d and 32g are displayed in the field frame 14a, and the user can recognize the second area 52 as described above. The range of the first area 51 is not indicated in the field frame 14a.

Figure 10:
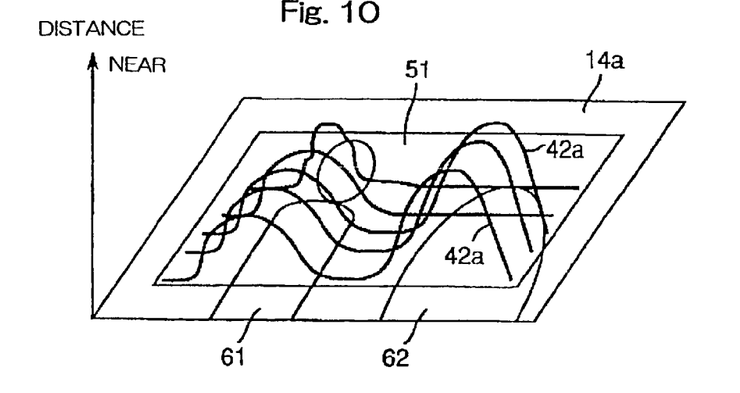
FIG. 10 is an explanatory view of a distance image.

Returning to FIG. 8, at step 82, the incident object light is integrated by the area sensors, and an image signal is captured from each of the pair of area sensors. The partial areas extracted from the image signals from the pair of area sensors 16a and 16b correspond to each other. The distance to the object can be calculated for each partial area (distance measurement point 42) based on the principle of the triangulation by use of the image signals of the corresponding partial areas of the area sensors 16a and 16b (AF calculation). The object distance distribution (hereinafter, referred to as distance image) is detected from the object distance information obtained for each of the distance measurement points. An example of the distance image is shown in FIG. 10. The distance image comprises the distances to the objects 61 and 62 in the field 14a arranged for each partial area (distance measurement point 42). In FIG. 10, it is apparent that the objects 61 and 62 are at shorter distances than the background and the object 62 is closer to the camera than the object 61. While the partial areas (distance measurement points 42) do not overlap each other in FIGS. 6 and 7, they may overlap each other. Moreover, it may be performed to calculate a distance measurement value for each of areas smaller than the partial areas by use of the distance measurement value obtained for each partial area and obtain the distance image from the distance information obtained for each of the smaller areas.

Figure 11:
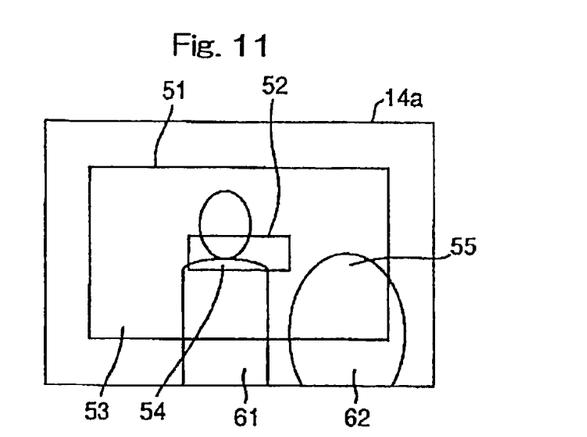
FIG. 11 is a view explaining the processing to divide an object image and select a main object.

Then, the image processor 23 divides the image information into a plurality of areas by use of the distance image. In the above-described example, as shown in FIG. 11, the image information is divided into areas 53, 54 and 55 corresponding to the background, the object 61 and the object 62, respectively, by use of the distance image shown in FIG. 10.

Then, at step 83, a target object as the main object is selected from the divisional areas. Of the areas 53, 54 and 55 obtained by the division at the previous step, an area at least part of which is present in the second area 52, that is, the area 54 corresponding to the object 61 is selected as the target object. When a plurality of divisional areas is present in the second area 52, for example, the area corresponding to the object at the shortest distance is selected as the target object. The target object may be selected based on the color information, the size and the shape of the divisional areas as well as the distance. Hereinafter, the explanation will be continued on the assumption that the object 61 is selected as the target object as the main object.

When the target object is selected, photometry calculation is performed for the target object, and which object is the target object is indicated in the finder. The indication is provided by the display controller 25 controlling the display 19 so that distance measurement frames are displayed. When these processings are finished for the target object as the main object, the CPU 20 stores characteristics of the main object into the memory 26. The characteristics of the main object include the distance to the object, the width of the object, the brightness of the object, and the position of the object on the screen for the divisional area 54.

Then, at step 85, it is determined whether the switch S1 is off or not. In the present embodiment, the switch S1 is turned on when the release button 17 is half depressed. When the release button 17 is not half depressed (the switch S1 is off), the process returns to step 81 to repeat the above-described loop for the image information on the object captured in time sequence.

Figure 12:
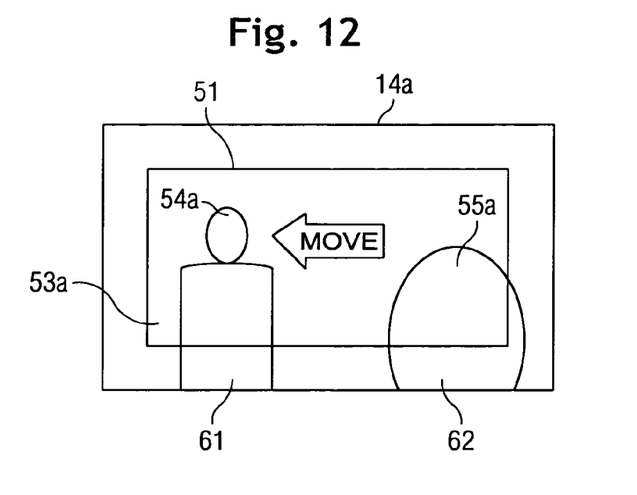
FIG. 12 is a view showing a succeeding object image.

When the release button 17 is half depressed, the process shifts to step 86 to perform the processing to follow the main object selected in the previous preprocessing. Assuming now that the object 61 moves leftward while the processing from step 86 is being performed, a case will be considered where the captured succeeding object image information is as shown in FIG. 12. A processing similar to that at step 82 of the main object selecting processing is performed on the succeeding object image information captured in time sequence, and the object image is divided based on the created distance image (step 86).

The CPU 20 selects an object to be followed which is the most appropriate object from the image divided at step 86 (step 87). In the present embodiment, the selection is made by making a comparison between the previously detected image of the area of the main object and the object image captured this time for each of the divisional areas. The succeeding object image information to be compared is information within the range of the first area 51. An area similar to the area 54 corresponding to the object 61 as the target object stored in the memory 26 is selected from among the divisional areas 53a, 54a and 55a. In the selection, the previously captured information on the area 54 stored in the memory 26 as described above is compared, for example, with the distance to the object, the width of the object, the brightness of the object and the position of the object on the screen in the succeeding divisional areas 53a, 54a and 55a. For example, the area 54a corresponding to the object 61 is selected as a result.

When the object to be followed is selected from the first area, the display controller 25 displays distance measurement frames 33b and 33c so that the object to be followed is surrounded by the frames 33b and 33c, and displays the object to be followed so that it is visually recognized by the user with ease (step 88). Then, the information on the object to be followed which is the main object is stored into the memory 26. The characteristics of the main object include, like the previously captured information on the area 54, the distance to the object, the width of the object, the brightness of the object and the position of the object on the screen with respect to the divisional area 54a. Moreover, a characteristic newly serving as a reference such as the direction of movement of the object 61 as the main object may be obtained based on the previously captured information on the area 54.

Then, the CPU 20 determines whether a switch S2 is off or not (step 89). The switch S2 is for determining whether the release button 17 is fully depressed or not. When the switch S2 is not off, that is, when the release button 17 is fully depressed, the CPU 20 stops the selection of the object to be followed, and performs shooting.

When the switch S2 is off, that is, when the release button 17 is not fully depressed, the process shifts to step 90 to determine whether the switch S1 is off or not. When the switch S1 is not off, that is, when the release button is kept half depressed, the process shifts to step 86 to continue the detection of the object to be followed by performing a processing similar to the above-described one based on the previously captured object image information. When the switch S1 is off, that is, when the release button 17 is released from the half-depressed condition, the process returns to step 81 to perform the target object selection processing from the beginning.

In the camera according to the present embodiment, the signals from the distance measurement information calculator 21 and the photometry information calculator 22 are transmitted to the taking lens controller 24 at regular intervals. Every time an object to be followed is selected while the release button 17 is half depressed, focus and exposure of the taking lens are adjusted in accordance with the object to be followed. The adjustment may be performed only at the time of shooting instead of every time an object to be followed is selected. In the case of digital cameras and movie cameras having a liquid crystal display, when the preview function and the moving image shooting are considered, it is desirable to perform the adjustment of the taking lens every time an object to be followed is selected.

The camera according to the present embodiment has a wide mode and a spot mode as well as the above-described target mode, and is capable of switching among the three shooting modes by the selector 13. In the wide mode, the main object is selected from the image information included in the first area 51 in response to a half depression of the release button 17, and the lens adjustment is performed with the selected main object as the reference. That is, after the main object is selected, the following of the main object is not performed. In this mode, the focus lock to determine the focus and the aperture with the selected object as the reference is performed in the comparatively large range of the first area.

In the spot mode, in response to a half depression of the release button 17, the main object is selected with the image information included in the second area being divided into a plurality of areas, and the lens adjustment is performed with the selected main object as the reference. That is, after the main object is selected, the following of the main object is not performed. In this mode, the focus lock to determine the focus and the aperture with the selected object as the reference is performed in the small range of the second area. This mode ensures the selection of the main object, and reduces the misdetection that an object not desired by the user is in focus.

As described above, according to the present embodiment, after a main object is selected in a small area, the camera follows the main object by capturing it in a large area, and focus adjustment can be performed with the object as the reference. Consequently, the out-of-focus condition caused when a moving object is shot with the focus lock and the misdetection of the object when the object is not present in the center can be prevented.

The present invention is not limited to the above-described embodiment, but may be embodied in various forms. For example, the present invention is also applicable to digital cameras and movie cameras.

Although the present invention has been fully described by way of examples with reference to the accompanying drawings, it is to be noted that various change and modifications will be apparent to those skilled in the art. Therefore, unless otherwise such changes and modifications depart from the scope of the present invention, they should be construed as being including therein.

What is claimed is:

1. An object detecting apparatus comprising:
   an image sensor for capturing a plurality of object images in time sequence;
   a characteristic detector for detecting a characteristic of the object in a first area of the object images captured by the image sensor;
   a first detector for detecting a main object to be shot in the first area;
   a second detector for detecting a main object to be shot, within a second area larger than the first area, of the object images captured by the image sensor based on the characteristic detected by the characteristic detector;
   a third detector for detecting a main object to be shot in the second area regardless of the characteristic of the object in the first area;
   a selector for selecting one of the detectors from the first, second and third detectors; and
   a controller for performing focusing for the main object detected by the selected detector.

2. An object detecting apparatus according to claim 1, wherein said image sensor is a distance measurement sensor, and said characteristic of the object is distance information to the object.

3. An object detecting method comprising the steps of:
   capturing a plurality of object images in time sequence;
   detecting a characteristic of the object in a first area of the captured object images;
   detecting a main object to be shot in the first area;
   detecting a main object to be shot within a second area, the second area larger than the first area, of the captured object images based on the detected characteristic;
   detecting a main object to be shot in the second area regardless of the detected characteristic of the object in the first area;
   selecting one of the detections from detecting a main object to be shot in the first area, detecting a main object to be shot within a second area and detecting a main object to be shot in the second area regardless of the detected characteristic; and
   performing focusing for the main object based upon the selected detection.

4. An object detecting method according to claim 3, wherein:
   the step of capturing a plurality of object images employs an image sensor that is a distance measurement sensor, and
   the step of detecting a characteristic detects distance information to the object.

* * * * *